United States Patent
Obaidi

(10) Patent No.: US 11,200,409 B2
(45) Date of Patent: Dec. 14, 2021

(54) UTILIZING AN ARRAY OF CAMERAS INCLUDING IOT SENSORS WITH CAMERAS TO SEARCH FOR OBJECTS VIA A WIRELESS COMMUNICATION NETWORK

(71) Applicant: T-Mobile USA, Inc., Bellevue, WA (US)

(72) Inventor: Ahmad Arash Obaidi, San Ramon, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 241 days.

(21) Appl. No.: 15/822,595

(22) Filed: Nov. 27, 2017

(65) Prior Publication Data

US 2019/0163967 A1 May 30, 2019

(51) Int. Cl.
| | | |
|---|---|---|
| G06K 9/00 | (2006.01) | |
| G06T 7/00 | (2017.01) | |
| H04N 7/18 | (2006.01) | |
| H04L 29/08 | (2006.01) | |

(52) U.S. Cl.
CPC ........ *G06K 9/00362* (2013.01); *G06T 7/0002* (2013.01); *G06T 7/97* (2017.01); *H04N 7/181* (2013.01); *G06K 2209/15* (2013.01); *G06T 2207/30196* (2013.01); *G06T 2207/30232* (2013.01); *G06T 2207/30252* (2013.01); *H04L 67/12* (2013.01); *H04L 67/20* (2013.01)

(58) Field of Classification Search
None
See application file for complete search history.

(56) References Cited

U.S. PATENT DOCUMENTS

| | | | | |
|---|---|---|---|---|
| 2011/0058034 A1* | 3/2011 | Grass | ................. | H04N 7/18 348/143 |
| 2011/0153617 A1* | 6/2011 | Uehara | .............. | G06K 9/00744 707/741 |
| 2015/0063711 A1* | 3/2015 | Briggs | ............... | G06K 9/00979 382/203 |

(Continued)

OTHER PUBLICATIONS

Song, Sejun, et al. "Effective opportunistic crowd sensing IoT system for restoring missing objects." 2015 IEEE international conference on services computing. IEEE, 2015. (Year: 2015).*

(Continued)

*Primary Examiner* — Vu Le
*Assistant Examiner* — Tracy Mangialaschi
(74) *Attorney, Agent, or Firm* — Lee & Hayes, P.C.

(57) ABSTRACT

A method of searching for missing objects by gathering images from an array of cameras in a wireless communication network. The method includes receiving, at an image server via the wireless communication network, images from the array of cameras, which are communicatively coupled to the wireless communication network. The method further includes receiving, at the server from a third party via the wireless communication network, (i) a reference image, wherein the reference image includes an object of interest, and (ii) a request as to whether the object of interest is present in any of the images. The images are analyzed with respect to the reference image to determine if any of the images include the object of interest.

21 Claims, 4 Drawing Sheets

(56) References Cited

U.S. PATENT DOCUMENTS

| | | | |
|---|---|---|---|
| 2015/0087258 A1* | 3/2015 | Barnes | H04W 4/90 455/404.2 |
| 2016/0094810 A1* | 3/2016 | Mirza | G08B 13/19645 348/159 |
| 2016/0309123 A1* | 10/2016 | Edwards | G06K 9/00771 |
| 2017/0337790 A1* | 11/2017 | Gordon-Carroll | G06F 16/9537 |
| 2017/0337791 A1* | 11/2017 | Gordon-Carroll | H04L 67/12 |
| 2018/0189661 A1* | 7/2018 | Tatourian | G06F 21/6245 |
| 2019/0171890 A1* | 6/2019 | Yu | G06K 9/00825 |

OTHER PUBLICATIONS

Chen, Zhuo, et al. "QuiltView: A crowd-sourced video response system." Proceedings of the 15th Workshop on Mobile Computing Systems and Applications. 2014. (Year: 2014).*

* cited by examiner

UTILIZING AN ARRAY OF CAMERAS INCLUDING IOT SENSORS WITH CAMERAS TO SEARCH FOR OBJECTS VIA A WIRELESS COMMUNICATION NETWORK

BACKGROUND

In recent years, mobile telecommunication devices have advanced from offering simple voice calling services within wireless networks to providing users with many new features. Mobile telecommunication devices now provide messaging services such as email, text messaging, and instant messaging; data services such as Internet browsing; media services such as storing and playing a library of favorite songs; location services; and many others. In addition to the new features provided by the mobile telecommunication devices, users of such mobile telecommunication devices have greatly increased. Such an increase in users is only expected to continue and in fact, it is expected that there could be a growth rate of twenty times more users in the next few years alone.

People often lose or misplace things when out in public. It can be very difficult to find such lost things. Additionally, people themselves can go missing. For example, Amber Alerts are often issued when a child is abducted. The Amber Alerts generally include information relating to a vehicle that was involved with the abduction of the child. However, Amber Alerts rely on people identifying or "spotting" the vehicle, which can be difficult if the vehicle is moving. Use of mobile telecommunication devices in wireless networks may aid in locating lost things, including missing people.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1A:
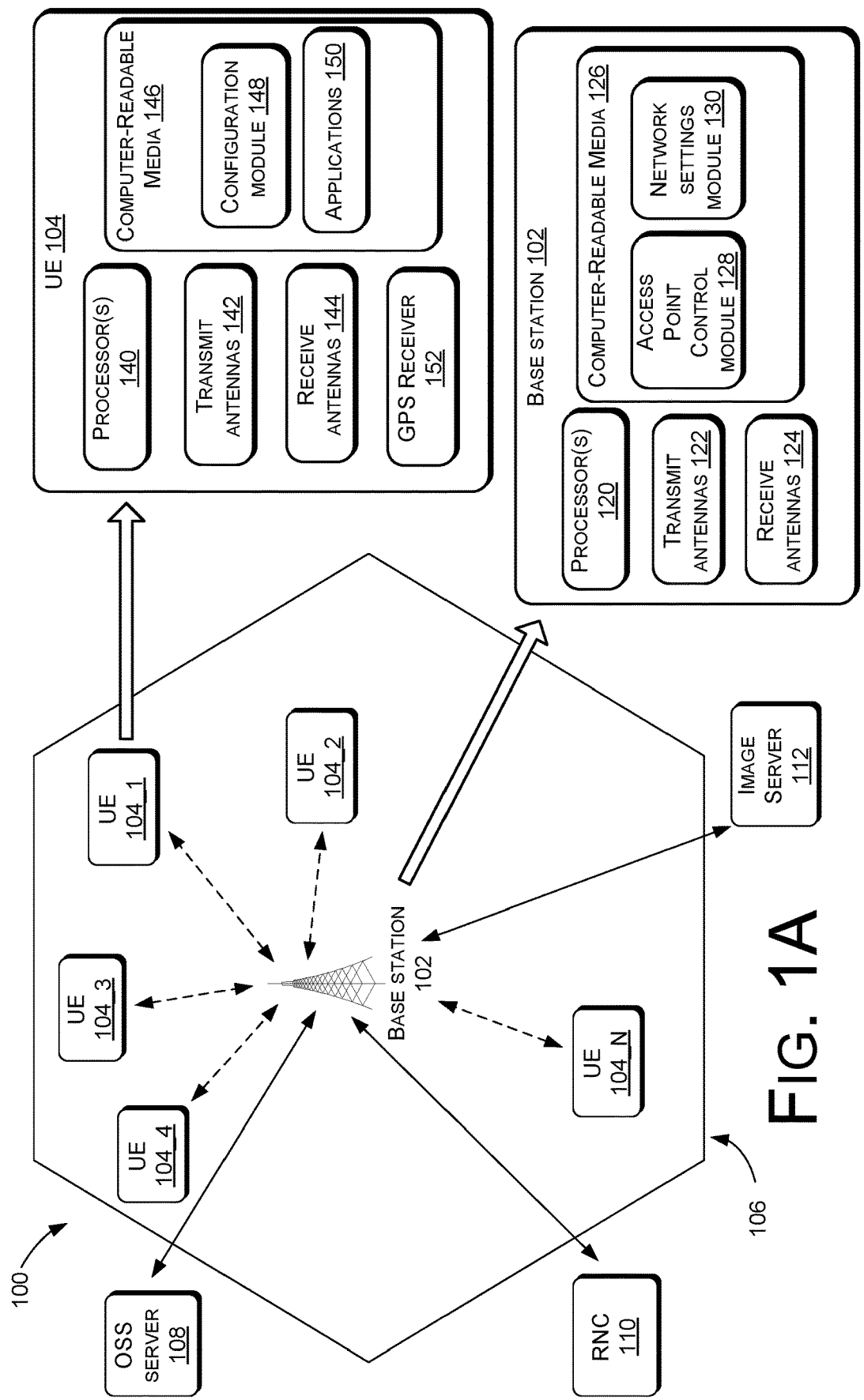
FIGS. 1A and 1B schematically illustrate a wireless communication network, in accordance with various embodiments.

Described herein is a wireless communication network and mobile devices for use in the wireless communication network that include techniques and architecture for searching for missing objects by gathering images from an array of cameras that may include mobile devices, Internet of Things (IoT) sensors with cameras, IoT devices, cameras, etc., and comparing the images with a reference image that includes the missing object. For example, an Amber Alert may be issued for a missing child and one or more reference images may include a picture of the child and/or a picture of the car involved with the abduction of the missing child. The reference image(s) may be provided to an operator of the wireless communication network and images gathered from the array of cameras may be compared with the reference image(s) in order to determine if the images include the missing child and/or motor vehicle. If any of the images do include the missing child and/or motor vehicle, then the appropriate parties may be notified of the locations of the cameras that provided the image(s).

More particularly, the array of cameras may be communicatively coupled to the wireless communication network. The array of cameras may include, for example, Internet of Things (IoT) sensors equipped with cameras. IoT sensors are generally placed in public places for gathering data. For example, the IoT sensors may gather data related to noise, pollution, number of cars passing through an intersection, number of people using crosswalks, number of people walking on the sidewalks, etc. The array of cameras may also include other devices configured as IoT devices, including mobile devices. For example, motor vehicles, security cameras, etc., may be configured as IoT devices, or may include one or more components configured as IoT devices. The array of cameras may also include closed-circuit television (CCTV) cameras, traffic cameras, and other privately owned cameras, e.g., security cameras. Such cameras may be configured as IoT devices (or include one or more components configured as IoT devices), or may be communicatively coupled to the wireless communication network in some other fashion.

Thus, IoT devices are generally capable of communicating with various other devices. Generally, Internet of Things refers to a network of physical objects—devices, vehicles, buildings and other items embedded with electronics, software, sensors, and network connectivity—that enables these objects to collect and exchange data. IoT allows objects to be sensed and controlled remotely across existing network infrastructure, creating opportunities for more direct integration of the physical world into computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each thing is uniquely identifiable through its embedded computing system, but is able to interoperate within the existing Internet infrastructure.

Images gathered by the array of cameras may be provided to the wireless communication network. For example, images gathered by the array of cameras may be provided to an image server that may store the images either on itself or in a separate repository. In configurations, a notification may be received by the wireless communication network, e.g., at the image server, providing a notification that a third party is looking for something. For example, the notification may indicate that a child is missing and thus, may provide one or more reference images that include pictures that include objects of interest such as the child, a motor vehicle involved in the disappearance of the child, one or more persons involved in the disappearance of the child, etc. The image server may then analyze images that have been received from the array of cameras in order to see if any of the images include the objects of interest included in the reference images provided by the notification. If any of the images do include any of the objects of interest in the reference images, then the third party may be notified as to the location of the cameras from the array of cameras that provided the images. In configurations, multiple images may include the objects of interest, which may mean the child and/or motor vehicle is moving and thus, multiple camera locations may be provided to the appropriate authorities, e.g., law enforcement. Other examples of objects of interest that may be searched for in a similar manner may include people wanted by the police, people skipping bail, lost animals, stolen vehicles or items, lost items, etc.

More particularly, when an Amber Alert that includes one or more reference images is issued over the wireless communication network, the image server may automatically search images that it has received from the array of cameras. The image server may search the images that have been received from the array of cameras to see if any of the images include the missing child that is the subject of the Amber Alert and/or a motor vehicle associated with the disappearance of the missing child, or any other information included in the Amber Alert. Additionally, the image server may continue to search images as images are received from the array of cameras.

Additionally, in configurations, reference images that include objects of interest (e.g., missing persons, motor vehicles, missing items, persons of interest, etc.) may be passed along to any of the cameras of the array of cameras that are devices capable of performing edge computing. Thus, as such cameras obtain images, the cameras can utilize edge computing in order to compare the reference images with images that are obtained by the cameras.

In configurations, all images from the array of cameras and reference images may be provided to a third party to perform the analysis in searching for objects of interest in the reference images. More particularly, in configurations, all images may be forwarded from the array of cameras to the image server via the wireless communication network and the image server may forward the images, along with the reference images, to a third party for evaluation with respect to reference images. Additionally, in configurations, the image server may not receive any notification (and/or reference images) with respect to objects of interest but rather may receive a request from a third party for images obtained by the image server from the array of cameras. The image server may then forward the images to the third party.

In configurations, many of the cameras of the array of cameras are located in a public area and thus, images obtained therefrom are not subject to privacy constraints. However, when a request comes in for a missing object, e.g., an Amber Alert, mobile devices of private entities may receive the Amber Alert, either automatically or it may be provided by an operator of the wireless communication network. A request may be made to retrieve images from the mobile devices and other IoT devices of the private entities for analysis in order to find the missing object. Such permission may be granted by the private entities for a limited time, e.g., one hour, six hours, one day, one week, etc., or until the object is found or until the search is cancelled. For example, security cameras around a private entity's place of business or home may be configured as IoT devices and thus, images from those security cameras may be provided for use in the search.

In configurations, the described arrangement and methods may be used as a "lost and found" service. For example, a party may forward a reference image of an object that the party has lost over the wireless communication network to the image server. Images obtained from the array of cameras may be utilized to search for the lost object. The search may continue with new images as they are obtained by the array of cameras. Additionally, entities may find objects and may provide images to the image server indicating that "I have found this." The image server may attempt to match the item with images received from parties who have lost objects. After a certain amount of time, the found objects may be put up for sale at a marketplace if no images of lost objects are matched to images of found objects.

FIG. 1A illustrates a wireless communication network 100 (also referred to herein as network 100). The network 100 comprises a base station (BS) 102 communicatively coupled to a plurality of user devices, referred to as UEs 104_1, 104_2, . . . , 104_N, where N is an appropriate integer. The BS 102 serves UEs 104 located within a geographical area, e.g., within a macro cell 106. FIG. 1A illustrates the macro cell 106 to be hexagonal in shape, although other shapes of the macro cell 106 may also be possible. In general, the network 100 comprises a plurality of macro cells 106, with each macro cell 106 including one or more BSs 102. In configurations, the macro cells 106 may be divided into small cells (not illustrated), e.g., femto cells, pico cells, micro cells, or the like. The multiple macro cells 106 and small cells may be organized into multiple subnetworks that make up the wireless communication network 100. For example, the wireless communication network 100 may be a national network and thus, the wireless communication network 100 may be divided into four regional subnetworks, where each regional subnetwork includes multiple macro cells 106 that may be divided into small cells.

In an embodiment, the UEs 104_1, . . . , 104_N may comprise any appropriate devices, e.g., portable electronic devices, for communicating over a wireless communication network. Such devices include mobile telephones, cellular telephones, mobile computers, Personal Digital Assistants (PDAs), radio frequency devices, handheld computers, laptop computers, tablet computers, palmtops, pagers, devices configured as IoT devices, IoT sensors that include cameras, integrated devices combining one or more of the preceding devices, and/or the like. As such, UEs 104_1, . . . , 104_N may range widely in terms of capabilities and features. For example, one of the UEs 104_1, . . . , 104_N may have a numeric keypad, a capability to display only a few lines of text and be configured to interoperate with only Global System for Mobile Communications (GSM) networks. However, another of the UEs 104_1, . . . , 104_N (e.g., a smart phone) may have a touch-sensitive screen, a stylus, an embedded GPS receiver, and a relatively high-resolution display, and be configured to interoperate with multiple types of networks. UEs 104_1, . . . , 104_N may also include SIM-less devices (i.e., mobile devices that do not contain a functional subscriber identity module ("SIM")), roaming mobile devices (i.e., mobile devices operating outside of their home access networks), and/or mobile software applications.

In an embodiment, the BS 102 may communicate voice traffic and/or data traffic with one or more of the UEs 104_1, . . . , 104_N. The BS 102 may communicate with the UEs 104_1, . . . , 104_N using one or more appropriate wireless communication protocols or standards. For example, the BS 102 may communicate with the UEs 104_1, . . . , 104_N using one or more standards, including but not limited to GSM, Internet Protocol (IP) Multimedia Subsystem (IMS), Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), Wi-Fi protocols (including IEEE 802.11 protocols), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like.

The BS 102 may be communicatively coupled (e.g., using a backhaul connection, illustrated using solid lines in FIG. 1A) to a number of backhaul equipments, e.g., an operation support subsystem (OSS) server 108, a radio network controller (RNC) 110, and/or the like. The RNC 110 can also be in the form of a mobility management entity that serves as a gateway when the wireless communication network 100 operates according to the long term evolution (LTE) standard or LTE Advanced standard. The BS 102 may also be communicatively coupled to an image server 112 that receives images from UEs 104, including IoT sensors that include cameras, as will be described further herein. In configurations, the image server 112 may be part of the RNC 110.

In an embodiment, the base station 102 may comprise processors 120, one or more transmit antennas (transmitters) 122, one or more receive antennas (receivers) 124, and computer-readable media 126. The processors 120 may be configured to execute instructions, which may be stored in the computer-readable media 126 or in other computer-readable media accessible to the processors 120. In some embodiments, the processors 120 are a central processing unit (CPU), a graphics processing unit (GPU), or both CPU and GPU, or any other sort of processing unit. The base station 102 can also be in the form of a Node B (where the wireless communication network 100 is 3G UMTS network) or in the form of an eNode B (where the wireless communication network 100 operates according to the LTE standard or LTE Advanced standard).

The one or more transmit antennas 122 may transmit signals to the UEs 104_1, . . . , 104_N, and the one or more receive antennas 124 may receive signals from the UEs 104_1, . . . , 104_N. The antennas 122 and 124 include any appropriate antennas known in the art. For example, antennas 122 and 124 may include radio transmitters and radio receivers that perform the function of transmitting and receiving radio frequency communications. In an embodiment, the antennas 122 and 124 may be included in a transceiver module of the BS 102.

The computer-readable media 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the base station 102. The computer-readable media 126 may reside within the base station 102, on one or more storage devices accessible on a local network to the base station 102, on cloud storage accessible via a wide area network to the base station 102, or in any other accessible location.

The computer-readable media 126 may store modules, such as instructions, data stores, and so forth that are configured to execute on the processors 120. For instance, the computer-readable media 126 may store an access point control module 128 and a network settings module 130, as will be discussed in more detail herein later.

Although FIG. 1A illustrates the computer-readable media 126 in the BS 102 storing the access point control module 128 and the network settings module 130, in various other embodiments, the access point control module 128, the network settings module 130, and one or more other modules (not illustrated, may be stored in another component of the network 100 (e.g., other than the BS 102). For example, one or more of these modules may be stored in a computer-readable media included in the OSS server 108, the RNC 110, another appropriate server associated with the network 100, and/or the like.

Although not illustrated in FIG. 1A, various other modules (e.g., an operating system module, basic input/output systems (BIOS), etc.) may also be stored in the computer-readable media 126. Furthermore, although not illustrated in FIG. 1A, the base station 102 may comprise several other components, e.g., a power bus configured to supply power to various components of the base station 102, one or more interfaces to communicate with various backhaul equipment, and/or the like.

In an embodiment, the UEs 104 may comprise processors 140, one or more transmit antennas (transmitters) 142, one or more receive antennas (receivers) 144, and computer-readable media 146 in the form of memory and/or cache. The processors 140 may be configured to execute instructions, which may be stored in the computer-readable media 146 or in other computer-readable media accessible to the processors 140. In some embodiments, the processors 140 is a central processing unit (CPU), a graphics processing unit (GPU), or both CPU and GPU, or any other sort of processing unit. The one or more transmit antennas 142 may transmit signals to the base station 102, and the one or more receive antennas 144 may receive signals from the base station 102. In an embodiment, the antennas 142 and 144 may be included in a transceiver module of the UE 104.

The computer-readable media 146 may also include CRSM. The CRSM may be any available physical media accessible by a computing device to implement the instructions stored thereon. CRSM may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which can be used to store the desired information and which can be accessed by the UE 104.

The computer-readable media 146 may store several modules, such as instructions, data stores, and so forth that are configured to execute on the processors 140. For instance, the computer-readable media 140 may store a configuration module 148. In configurations, the computer-readable media 146 may also store one or more applications 150 configured to receive and/or provide voice, data and messages (e.g., short message service (SMS) messages, multi-media message service (MMS) messages, instant messaging (IM) messages, enhanced message service (EMS) messages, etc.) to and/or from another device or component (e.g., the base station 102, other UEs, etc.). The applications 150 may also include third-party applications that provide additional functionality to the UE 104. In configurations, the UE 104 may also comprise a Global Positioning System (GPS) receiver 152 and/or another location determination component.

Although not illustrated in FIG. 1A, the UEs 104 may also comprise various other components, e.g., a battery, a charging unit, one or more network interfaces, an audio interface, a display, a keypad or keyboard, and other input and/or output interfaces.

Although FIG. 1A illustrates only one UE (UE 104_1) in detail, each of the UEs 104_2, . . . , 104_N may have a structure that is at least in part similar to that of the UE 104_1. For example, similar to the UE 104_1, each of the UEs 104_2, . . . , 104_N may comprise processors, one or more transmit antennas, one or more receive antennas, and computer-readable media including a configuration module.

In an embodiment, the network settings module 130 stored in the computer-readable media 126 maintains a plurality of network settings associated with the network 100. Individual network settings maintained by the network settings module 130 may be pertinent to a single UE of the UEs 104_1, . . . , 104_N, a subset of the UEs 104_1, . . . , 104_N, or each of the UEs 104_1, . . . , 104_N. For example, a network setting of the plurality of network settings may specify a maximum bit rate at which a UE (or each of the UEs 104_1, . . . , 104_N) may transmit data to the BS 102. Another network setting of the plurality of network settings may specify a transmit time interval (tti) used by each of the UEs 104_1, . . . , 104_N to transmit data to the BS 102. Yet another network setting of the plurality of network settings may specify a maximum power that each of the UEs 104_1, . . . , 104_N may use to transmit data to the BS 102. The plurality of network settings maintained by the network settings module 130 may also include any other appropriate type of network settings.

In an embodiment, one or more of the plurality of network settings maintained by the network settings module 13 may be communicated to the UEs 104_1, . . . , 104_N (e.g., by the transmit antennas 122 to the receive antennas 144 of the UEs 104_1, . . . , 104_N). Based on receiving the network settings, the UEs 104_1, . . . , 104_N (e.g., the corresponding configuration modules 148) may configure themselves and communicate with the BS 102 accordingly.

Figure 1B:
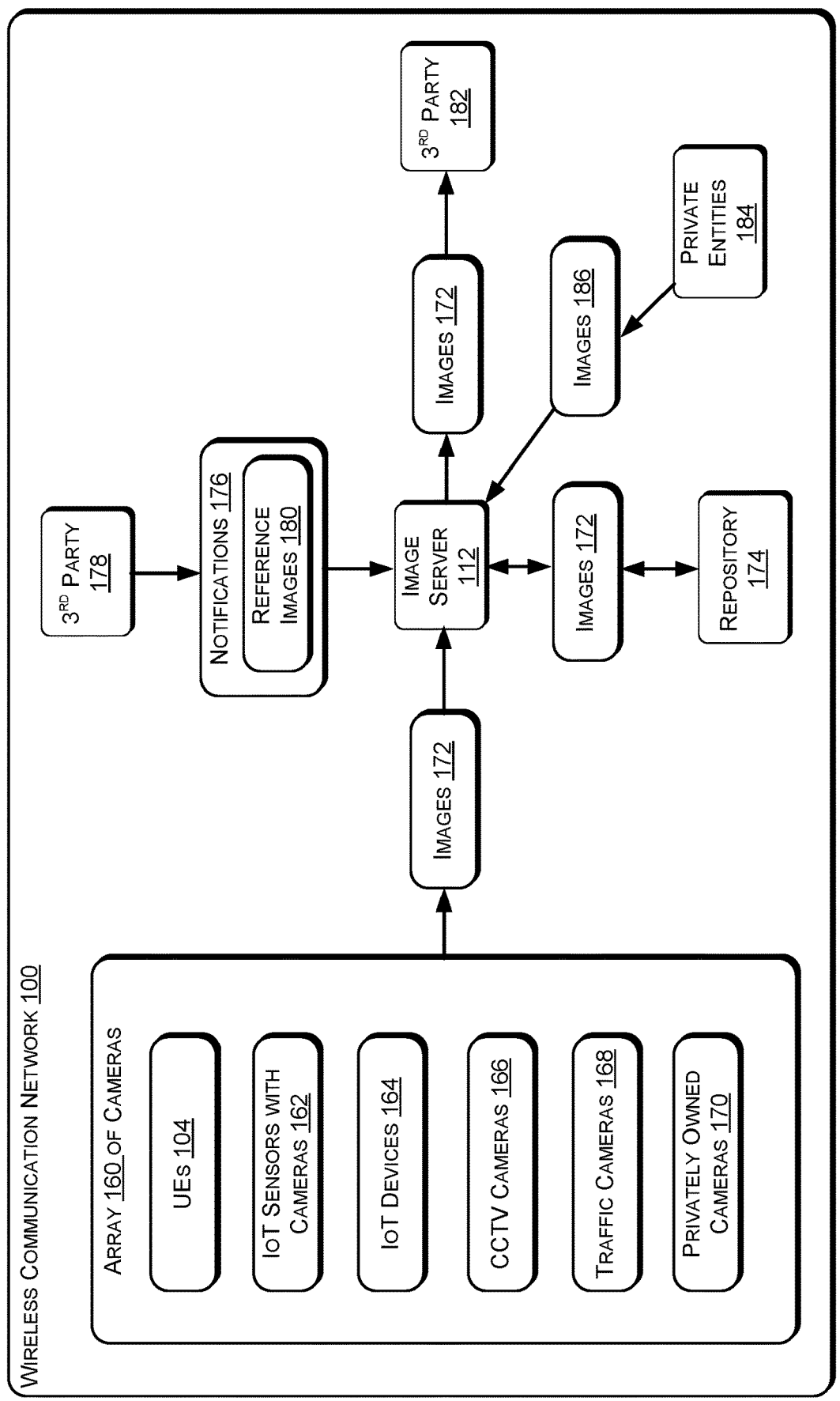

FIG. 1B schematically illustrates an arrangement of an array 160 of cameras within and communicatively coupled to the wireless communication network 100. The array 160 of cameras may include, for example, UEs 104, which, as previously noted, include IoT sensors 162 equipped with cameras. As previously noted, IoT sensors 162 are generally placed in public places for gathering data. For example, the IoT sensors 162 may gather data related to noise, pollution, number of cars passing through an intersection, number of people using crosswalks, number of people walking on the sidewalks, etc. The array 160 of cameras may also include other devices 164 configured as IoT devices. For example, motor vehicles, security cameras, etc., may be configured as IoT devices 164, or may include one or more components configured as IoT devices 164. The array 160 of cameras may also include closed-circuit television (CCTV) cameras 166, traffic cameras 168, and/or other privately owned cameras 170, e.g., security cameras. Such cameras may be configured as IoT devices (or include one or more components configured as IoT devices), or may be communicatively coupled to the wireless communication network 100 in some other fashion. Other types of cameras not specifically listed here may also be included in the array 160 of cameras.

Images 172 gathered by the array 160 of cameras may be provided to the wireless communication network 100. For example, images 172 gathered by the array 160 of cameras may be provided to the image server 112 that may store the images either on itself or in a separate repository 174. In configurations, a notification 176 may be received by the wireless communication network 100, e.g., at the image server 112, indicating that a third party 178 is looking for something. For example, the notification 176 may indicate that a child is missing and thus, may provide one or more reference images 180 that include objects of interest such as the child, a motor vehicle involved in the disappearance of the child, license plate of the motor vehicle involved (which may simply be included in the notification 176 rather than in a reference image 180), one or more persons involved in the disappearance of the child, etc. The image server 112 may then analyze images 172 that have been received from the array 160 of cameras in order to see if any of the images 172 include any of the objects of interest included in the reference images 180 provided by the notification 176. If any of the images 172 do include any of the objects of interest in the reference images 180, then the third party 178 may be notified as to the location of the cameras from the array 160 of cameras that provided the images 172. In configurations, multiple images 172 may include the objects of interest, which may mean, for example, the child and/or motor vehicle is moving and thus, multiple camera locations may be provided to the third party 178, e.g., appropriate authorities such as law enforcement. The image server 112 may continue to search images 172 as images 172 are received from the array 160 of cameras until the search is called off. Other examples of objects of interest that may be searched for in a similar manner may include people wanted by the police, people skipping bail, lost animals, stolen vehicles or items, lost items, etc.

More particularly, when an Amber Alert that includes one or more reference images 180 is issued over the wireless communication network 100, the image server 112 may automatically search images 172 that it has received from the array 160 of cameras. The image server 112 may search the images 172 that have been received from the array 160 of cameras to see if any of the images 172 include the missing child that is the subject of the Amber Alert and/or a motor vehicle associated with the disappearance of the missing child, or any other information included in the Amber Alert. Additionally, the image server 112 may continue to search images 172 as images 172 are received from the array 160 of cameras until the Amber Alert is called off.

Additionally, in configurations, reference images 180 that include objects of interest (e.g., missing persons, motor vehicles, missing items, persons of interest, etc.) may be passed along to any of the cameras of the array 160 of cameras that are devices capable of performing edge computing. Thus, as such cameras obtain images, the cameras can utilize edge computing in order to compare the reference images 180 with images 172 that are obtained by the cameras.

In configurations, all images 172 from the array 160 of cameras and reference images 180 may be provided to a third party 182 to perform the analysis in searching for objects of interest in the reference images 180. More particularly, in configurations, all images 172 may be forwarded from the array 160 of cameras to the image server 112 via the wireless communication network 100 and the image server 112 may forward the images 172, along with the reference images 180, to the third party 182 for evaluation with respect to the reference images 180. Additionally, in configurations, the image server 112 may not receive any notification 176 (and/or reference images 180) with respect to objects of interest but rather may receive a request from the third party 178 for images 172 obtained by the image server 112 from the array 160 of cameras. The image server 112 may then forward the images 172 to the third party 178.

In configurations, many of the cameras of the array 160 of cameras are located in a public area and thus, images 172 obtained therefrom are not subject to privacy constraints. However, when a request comes in for a missing object, e.g., an Amber Alert, UEs 104 of private entities 184 may receive the Amber Alert, either automatically or it may be provided by an operator of the wireless communication network 100. A request may be made to retrieve images 186 from the UEs 104 (and other IoT devices) of the private entities 184 for analysis in order to find the missing object. Such permission may be granted by the private entities 184 until the object is found for a limited time, e.g., one hour, six hours, one day, one week, etc., or until the search is cancelled. For example, security cameras around a private entity's place of business or home may be configured as IoT devices and thus, images 186 from those security cameras may be provided for use in the search.

In configurations, the described arrangement and methods may be used as a "lost and found" service. For example, a third party 178 may forward a reference image 180 of an object that the third party 178 has lost (or had stolen) over the wireless communication network 100 to the image server 112. Images 172 obtained from the array 160 of cameras may be utilized to search for the lost object. The search may continue with new images 172 as they are obtained by the array 160 of cameras. Additionally, entities may find objects and may provide reference images 180 to the image server 112 indicating that "I have found this." The image server 112 may attempt to match the images 180 of found objects with images 180 of lost objects received from parties who have lost objects. After a certain amount of time, the found objects may be put up for sale at a marketplace if no images of found objects are matched with images of lost objects.

Figure 2:
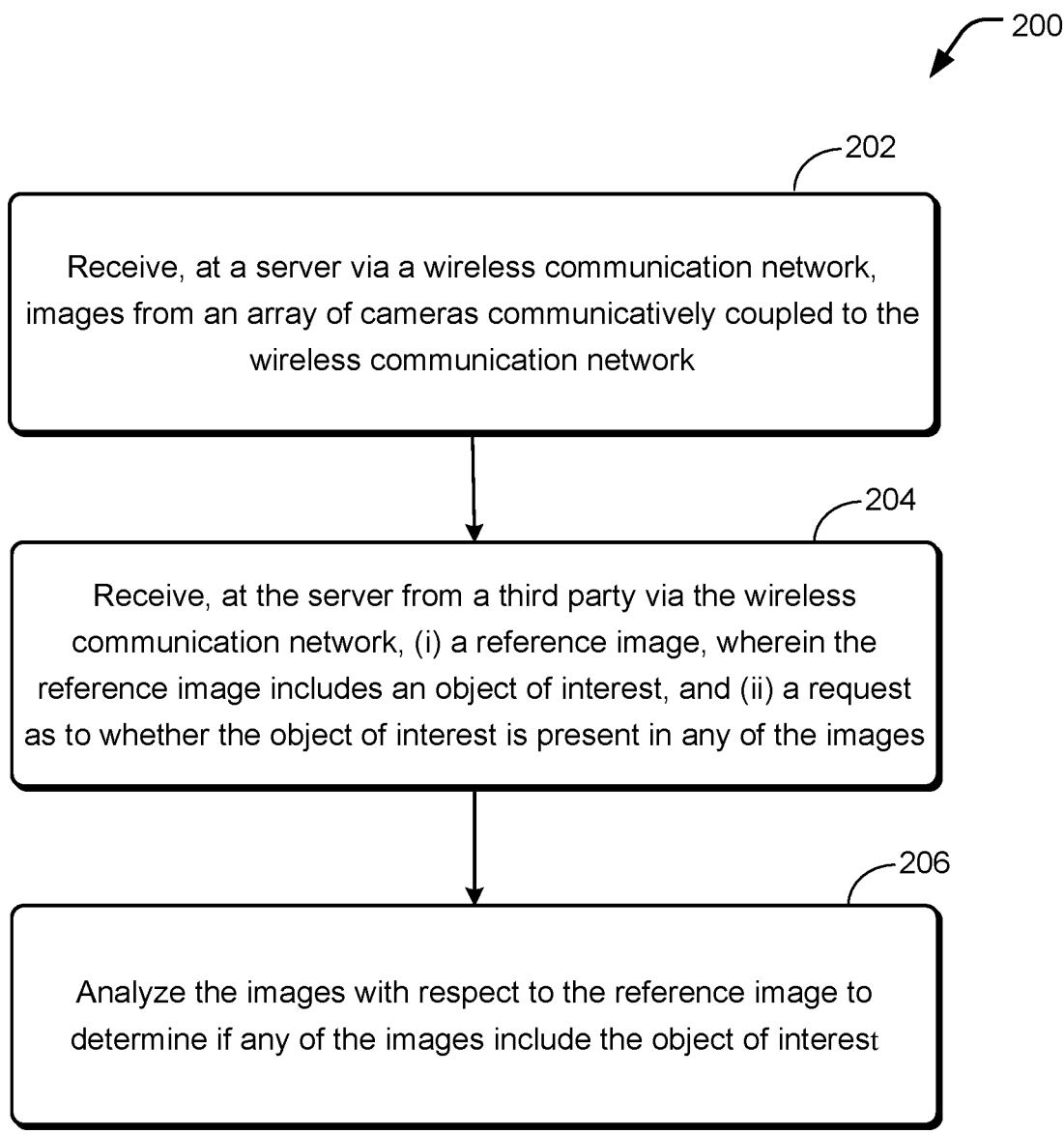
FIG. 2 is a flowchart illustrating a method of searching for missing objects by gathering images from an array of cameras in the wireless communication network of FIGS. 1A and 1B, in accordance with various embodiments.

FIG. 2 is a flow diagram of an illustrative process that may be implemented within the wireless communication network 100. This process (as well as other processes described throughout) are illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processors and processing cores in other environments and computing devices.

FIG. 2 is a flowchart illustrating a method 200 of searching for missing objects by gathering images, e.g., images 172, from an array of cameras, e.g., array 160 of cameras, in a wireless communication network, e.g., wireless communication network 100. As illustrated, at block 202, a server, e.g., image server 112, receives the images from the array of cameras via the wireless communication network, where the array of cameras is communicatively coupled to the wireless communication network. At block 204, the server receives, from a third party via the wireless communication network, (i) a reference image, wherein the reference image includes an object of interest, and (ii) a request as to whether the object of interest is present in any of the images. At block 206, the images are analyzed with respect to the reference image to determine if any of the images include the object of interest.

Figure 3:
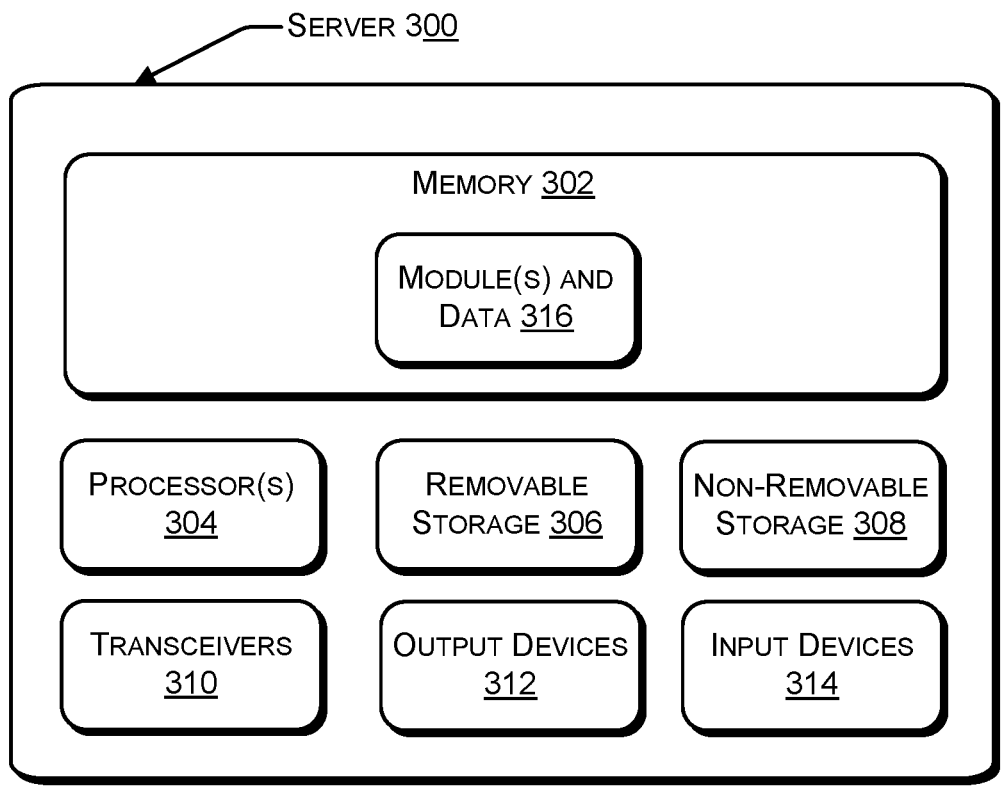
FIG. 3 schematically illustrates a component level view of a server configured for use in the arrangements of FIGS. 1A and 1B to provide various services of the wireless communication network of FIGS. 1A and 1B.

FIG. 3 illustrates a component level view of a server configured for use within a wireless communication network, e.g., wireless communication network 100 in order to provide various services within the wireless communication network, according to the techniques described herein. The server 300 may serve as the OSS server 108 or may be located in the RNC or gateway 110. Additionally, the server 300 may serve as the image server 112 for operation in the wireless communication network 100 as described herein.

As illustrated, the server 300 comprises a system memory 302 that may store data and one or more modules and/or applications 316 for interacting with mobile devices 300, e.g., UEs 104, as described herein. Also, the server 300 includes processor(s) 304, a removable storage 306, a non-removable storage 308, transceivers 310, output device(s) 312, and input device(s) 314.

In various implementations, system memory 302 is volatile (such as RAM), non-volatile (such as ROM, flash memory, etc.) or some combination of the two. In some implementations, the processor(s) 304 is a central processing unit (CPU), a graphics processing unit (GPU), or both CPU and GPU, or any other sort of processing unit.

The server 300 may also include additional data storage devices (removable and/or non-removable) such as, for example, magnetic disks, optical disks, or tape. Such additional storage is illustrated in FIG. 3 by removable storage 306 and non-removable storage 308. The one or more of the memory 302, the removable storage 306 and/or the non-removable 308 may include module(s) and data 316 (illustrated in the memory 302). The module(s) and data 316 may include instructions executable by, for example, the processors 304.

Non-transitory computer-readable media may include volatile and nonvolatile, removable and non-removable tangible, physical media implemented in technology for storage of information, such as computer readable instructions, data structures, program modules, or other data. System memory 302, removable storage 306 and non-removable storage 308 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the server 300. Any such non-transitory computer-readable media may be part of the server 300.

In some implementations, the transceivers 310 include any sort of transceivers known in the art. For example, the transceivers 310 may include wired communication components, such as an Ethernet port, for communicating with other networked devices. Also or instead, the transceivers 310 may include wireless modem(s) to may facilitate wireless connectivity with other computing devices. Further, the transceivers 310 may include a radio transceiver that performs the function of transmitting and receiving radio frequency communications via an antenna.

In some implementations, the output devices 312 include any sort of output devices known in the art, such as a display (e.g., a liquid crystal display), speakers, a vibrating mechanism, or a tactile feedback mechanism. Output devices 312 also include ports for one or more peripheral devices, such as headphones, peripheral speakers, or a peripheral display.

In various implementations, input devices 314 include any sort of input devices known in the art. For example, input devices 314 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

I claim:

1. A method within a wireless communication network, the method comprising:
   receiving, at a server from a first third party system over the wireless communication network, a notification that a first object has been lost, wherein the notification includes a first reference image that includes the first object;
   receiving, at the server from a second third party system over the wireless communication network, a notification that a second object has been found, wherein the notification includes a second reference image that includes the second object;
   determining, by the server, the first object differs from the second object based at least in part on the first reference image and the second reference image;
   requesting, by the server over the wireless communication network, access to an array of cameras communicatively coupled to the wireless communication network and associated with a private entity, the request indicating a reason for the request;
   retrieving, by the server via the wireless communication network, third images from the array of cameras, the server retrieving the third images based on permission granted by the private entity for a limited duration of time, and the limited duration of time is associated with a period of time in which the server is allowed to retrieve the images from the private entity;
   identifying the first object based at least in part on the first reference image and the third images; and
   in response to determining a period of time associated with the second object has elapsed, placing the second object for sale at a marketplace.

2. The method of claim 1, further comprising notifying the first third party as to a location of one or more cameras of the array of cameras from which the third images were received by the server.

3. The method of claim 1, further comprising storing, by the server, the third images in a repository.

4. The method of claim 3, further comprising forwarding the third images from the repository to the first third party system.

5. The method of claim 1, wherein:
   the method further comprises forwarding, by the server, the first reference image to at least some of the cameras of the array of cameras.

6. The method of claim 5, wherein the at least some of the cameras of the array of cameras comprise one or more of (i) an Internet of Things (IoT) sensor that includes a camera, (ii) a mobile device configured as an IoT device, (iii) a motor vehicle configured as an IoT device or (iv) a security camera configured as an IoT device.

7. The method of claim 1, wherein the first object comprises at least one of (i) a person, (ii) a car, (iii) a license plate or (iv) an animal.

8. The method of claim 1, wherein the array of cameras comprises one or more of (i) an Internet of Things (IoT) sensor that includes a camera, (ii) a mobile device, (iii) a motor vehicle configured as an IoT device, (iv) a security camera configured as an IoT device, (v) a closed-circuit television (CCTV) camera or (vi) a traffic camera.

9. The method of claim 1, wherein the reason for the request is an Amber Alert.

10. A wireless communication network comprising:
    one or more processors;
    a non-transitory storage medium; and
    instructions stored in the non-transitory storage medium, the instructions being executable by the one or more processors to:
      receive, via the wireless communication network, a first reference image that includes a first object;
      request images from a camera associated with a private entity, the request indicating a reason for the request;
      receive, from the private entity, permission for the wireless communication network to retrieve images from the camera for a limited duration of time;
      receive images from an array of cameras communicatively coupled to the wireless communication network, wherein the array of cameras includes the camera associated with the private entity;
      receive from a second private entity an indication that a second object has been found and a second reference image that includes the second object;
      determine, by the wireless communication network, that the first object is not the second object based at least in part on the first reference image and the second reference image;
      analyze the received images with respect to the first reference image to determine if any of the images include the first object; and
      in response to determining a period of time associated with the second object has elapsed, placing the second object for sale at a marketplace.

11. The wireless communication network of claim 10, wherein the instructions are further executable by the one or more processors to:
    based upon the analyzing, determine that one or more images of the images include the first object; and
    notify a third party as to a location of one or more cameras of the array of cameras from which the images were received.

12. The wireless communication network of claim 10, wherein the instructions are further executable by the one or more processors to:
    store the images in a repository; and
    forward the images from the repository to a third party.

13. The wireless communication network of claim 12, wherein the instructions are further executable by the one or more processors to:
    forward the reference image to at least some cameras of the array of cameras.

14. The wireless communication network of claim 13, wherein the at least some of the at least some of the cameras comprise one or more of (i) an Internet of Things (IoT) sensor that includes a camera, (ii) a mobile device configured as an IoT device, (iii) a motor vehicle configured as an IoT device or (iv) a security camera configured as an IoT device.

15. The wireless communication network of claim 10, wherein the first object comprises at least one of (i) a person, (ii) a car, (iii) a license plate or (iv) an animal.

16. The wireless communication network of claim 10, wherein the array of cameras comprises one or more of (i) an Internet of Things (IoT) sensor that includes a camera, (ii) a mobile device, (iii) a motor vehicle configured as an IoT device, (iv) a security camera configured as an IoT device, (v) a closed-circuit television (CCTV) camera or (vi) a traffic camera.

17. A method within a wireless communication network, the method comprising:
    receiving, at a server from a third party via the wireless communication network, a notification that a first object has been lost, wherein the notification includes a first reference image that includes the first object;
    requesting, by the server over the wireless communication network, first images from a camera associated with a first private entity;
    receiving, at the server via the wireless communication network, permission from the first private entity, the permission allowing the server to retrieve the first images from the camera for a limited duration of time, the limited duration of time associated with a period of time in which the server is allowed to retrieve the first images;
    receiving, at the server via the wireless communication network, second images from an array of cameras communicatively coupled to the wireless communication network, wherein the array of cameras includes the camera associated with the first private entity;
    receiving from a second private entity an indication that a second object has been found and a second reference image that includes the second object;
    determining, by the server, the first object is not the second object based at least in part on the first reference image and the second reference image;
    in response to determining a period of time associated with the second object has elapsed, placing the second object for sale at a marketplace; and
    analyzing, by the server, the second images with respect to the first reference image to determine if any of the images include the first object.

18. The method of claim 17, further comprising:
    based upon the analyzing, determining that one or more images of the second images include the first object; and
    notifying the third party as to a location of one or more cameras of the array of cameras from which the one or more images were received by the server.

19. The method of claim 17, further comprising:
    forwarding, by the server, the first reference image to at least some of the cameras of the array of cameras; and
    analyzing, by respective ones of the at least some of the cameras, corresponding subsequent images obtained by the respective ones of the at least some of the cameras with respect to the first reference image to determine if any of the corresponding subsequent images include the first object.

20. The method of claim 19, wherein at least some of the at least some of the cameras comprise one or more of (i) an Internet of Things (IoT) sensor that includes a camera, (ii) a mobile device configured as an IoT device, (iii) a motor vehicle configured as an IoT device or (iv) a security camera configured as an IoT device.

21. The method of claim 17, wherein the array of cameras comprises one or more of (i) an Internet of Things (IoT) sensor that includes a camera, (ii) a mobile device, (iii) a motor vehicle configured as an IoT device, (iv) a security camera configured as an IoT device, (v) a closed-circuit television (CCTV) camera or (vi) a traffic camera.

* * * * *